Jan. 5, 1965 S. M. HEIDE 3,164,690

ROTARY TYPE ELECTRIC SWITCH WITH WAFER PLATE SHORTING STRUCTURE

Filed April 4, 1962 2 Sheets-Sheet 1

INVENTOR.
STANFORD M. HEIDE
BY Thuedy & Thuedy
HIS ATTORNEYS.

ROTARY TYPE ELECTRIC SWITCH WITH WAFER PLATE SHORTING STRUCTURE

Filed April 4, 1962

2 Sheets-Sheet 2

INVENTOR.
STANFORD M. HEIDE
BY
Whuedy & Whuedy
HIS ATTORNEYS 3,164,690

ROTARY TYPE ELECTRIC SWITCH WITH WAFER PLATE SHORTING STRUCTURE

Stanford M. Heide, Kenosha, Wis., assignor to Chicago Dynamic Industries, Inc., Chicago, Ill., a corporation of Illinois Filed Apr. 4, 1962, Ser. No. 185,110
10 Claims. (Cl. 200—11)

My invention relates to a new and useful improvement in a Rotary Type Electric Switch and more particularly to a rotary type switch including a switch wafer plate having a plurality of printed electrical circuit conductors thereon.

A principal object of my invention is in the provision in a switch of this character of a means for preventing distortion of circuit impulses or code characteristics by transients occurring in an electric circuit established through the switch.

Another object of my invention is in the provision in a switch of this character of a means for shorting each circuit on a printed circuit wafer plate when the circuit conductor is not being used to transmit an electrical impulse.

A further object of my invention is in the provision in a switch of this character of a means for completing a selected circuit from a plurality of circuits provided by a printed circuit wafer plate without disturbing the shorting out of each of the non-selected circuits.

Yet another object of my invention is in the provision in an electrical control device such as a rotary type switch which includes a printed circuit wafer plate having a plurality of circuit conductors thereon, a shortening member for each of the circuit conductors, a switch rotor disc rotatable over the circuit conductors so as to selectively contact and complete an electric circuit through any of the circuit conductors and a camming member carried by the rotor disc for displacing the circuit shorting member from the selected circuit to be energized through the control device.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
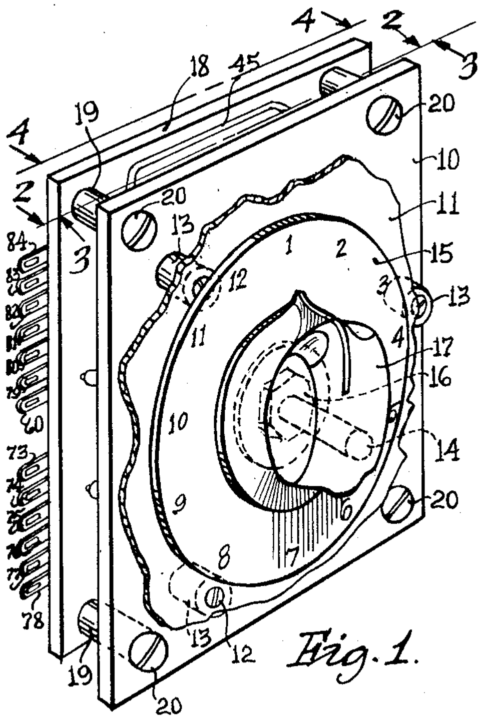
FIG. 1 is a perspective view of my electrical switch.

My improved switch includes a base plate 10 which is adapted to be connected to a mounting wall 11 by means of screws 12 threadably received in bushing 13. Through a suitable opening formed in the base plate 10 and wall 11 there extends an operating shaft 14. A switch positioning indicator plate 15 is mounted on the shaft 14 outwardly of the wall 11 and is retained thereon by a retaining nut 16. A switching knob 17 is mounted on the free exposed end of the shaft 14 as seen in FIG. 1.

A printed circuit wafer plate 18 is mounted in spaced parallel direction to the rear of the base plate 10 by means of spacer sleeves 19 through which extends suitable bolts 20.

Figure 2:
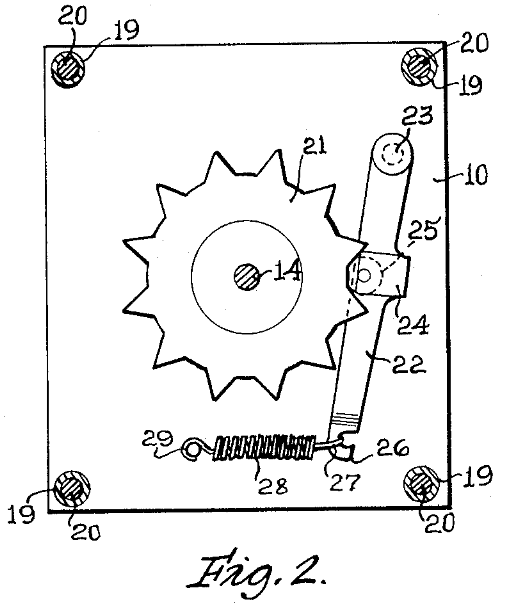
FIG. 2 is a rear elevational view of the mounting plate of my switch showing the indexing mechanism associated therewith taken on line 2—2 of FIG. 1.

To the rear of the base plate 10 between such base plate 10 and the wafer plate 18 is a switch position indicating mechanism. This mechanism comprises a twelve-pointed star wheel 21 rotably mounted on the shaft 14. An indexing arm 22 is pivotally connected as at 23 to the back wall of the mounting plate 10 and extends tangentially with respect to the periphery of the wheel 21. By a suitable bracket 24, the arm 22 provides a rotatable indexing roller 25 adapted to yieldably engage the star wheel 21, as seen in FIG. 2. The free end of the arm 22 provides a hook member 26 upon which is fixedly attached one end 27 of the coil spring 28. The opposite end of the spring is fixedly connected to a stud pin 29 provided by the base plate 10. Under tension of the spring 28 the roller 25 rests between the points of the star wheel 21 thus preventing undesired rotation of the shaft 14 while permitting yieldable rotation of the shaft through a sufficient turning force applied through the knob 17.

Figures 3, 4:
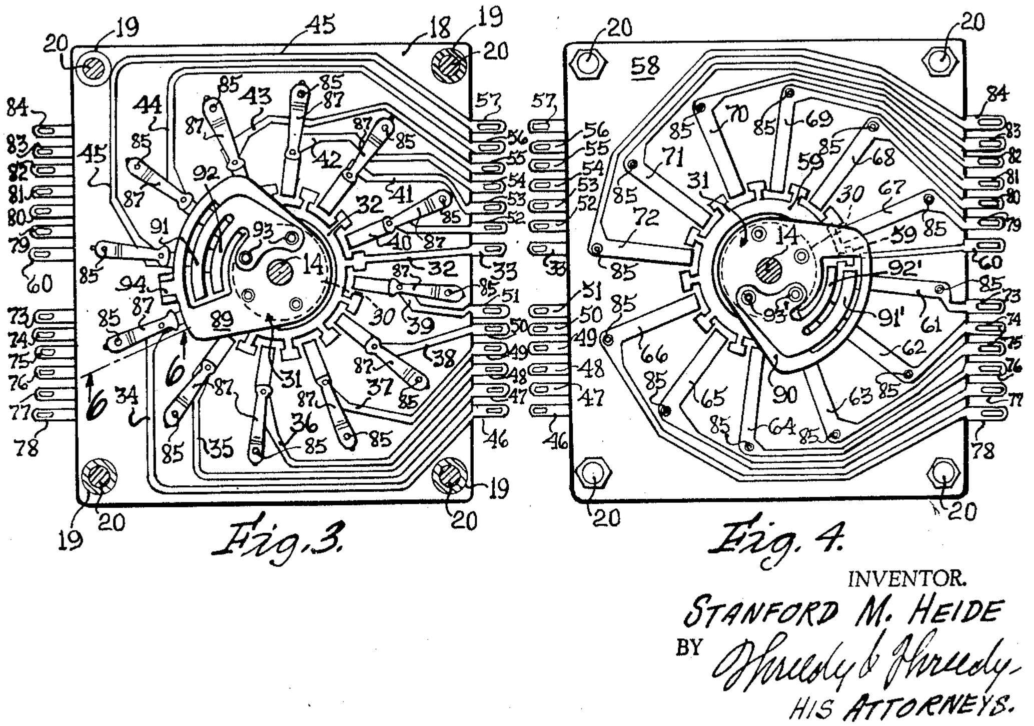
FIG. 3 is a side elevational view of one side of a printed circuit wafer plate taken on line 3—3 of FIG. 1.
FIG. 4 is an elevational view of the reverse side of the printed circuit wafer plate taken on line 4—4 of FIG. 1.

In FIG. 3 I disclose a printed circuit wafer plate 18 that is associated with my switch. This wafer plate 18 is provided with a center opening 30 into which is rotatably mounted a rotor disc 31. This roter disc 31 is fixedly connected to and rotatable with the shaft 14. Disposed about the opening 30 is a circular grounding strip 32 printed, plated or suitably attached to the plate 18. This grounding strip 32 terminates into a soldering terminal 33 to which may be attached a suitable ground connector. Spaced from the grounding strip 32 are circuit conductors 34 through 45, which are circularly arranged about the opening 30. These circuit conductors 34 through 45 are printed, plated or suitably attached to the wafer plate 18 in a manner well known in the art. Each of these circuit conductors 34 through 45 terminate into connecting terminals 46 through 57, all of which extend laterally from one side of the plate 18 as seen in FIG. 3.

Figure 6:
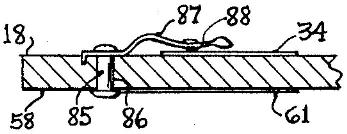
FIG. 6 is a fragmentary detailed sectional view taken on line 6—6 of FIG. 3, showing the shorting member as associated with each of the printed circuits carried by the circuit wafer plate.

Referring to FIG. 4 which is a view of the rear side 58 of the plate 18 as seen in FIG. 3, I show a layout of a printed circuitry which corresponds to the circuitry shown and described in FIG. 3. In this respect I show a grounding strip 59 having a connecting terminal 60 extending from the opposite side of the wafer plate 18. Spaced from the grounding circuit 59 are circuit conductors 61 through 72 which are circularly arranged around the opening 30 and correspond to the circuit conductors 34 through 45, as described and shown in FIG. 3. These circuit conductors 61 through 72 terminate into connecting terminals 73 to 84. The circuit conductors 34 through 45 are conductively connected to their corresponding circuit conductors 61 through 72 as carried on the rear side 58 of the plate 18 by means of rivets 85 which pass through suitable openings 86 formed in the plate 18. See FIGS. 6 and 7.

Each of these rivets 85 fixedly connect a shorting contact 87 to the face of the plate 18 as seen in FIG. 3. Each of these shorting contacts 87 provides a contact bead 88 which normally lies in facial contact with each of the conductors 34 to 45. In viewing FIG. 6 let us assume that the electrical circuit conductor 34, through its terminal 46, is connected to one side of an electrical circuit and that this side of the electrical circuit is also connected to the terminal 73 of the electrical conductor 61 carried by the rear side 58 of the plate 18. In such condition the electrical impulse of such circuit passes through the conductor 34 through the shorting contact 87, rivet 85, through the electrical conductor 61 thus creating a short circuit condition.

A switch constructed in accordance with the foregoing description and which includes a short circuit between circuit conductors of printed circuits connected in series, will prevent distortion of operating current or code characteristic impulses transmitted therethrough by oscillatory or aperiodic transient currents.

Figure 5:
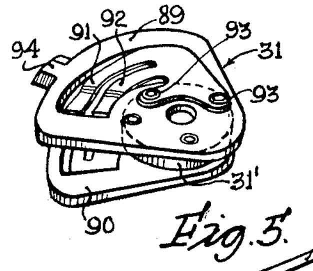
FIG. 5 is a perspective view of my switch rotor disc.

Referring to FIG. 5, I show my improved switch rotor disc 31. This rotor disc 31 consists of two spaced apart switch bearing segments 89 and 90 connected together by a center hub portion 31'. These segments 89 and 90 are formed from non-conductive material and each provide a cut-out portion through which extends switch fingers 91, 92, and 91' and 92' respectively. It should be noted that the switch fingers 91 and 92 extend in a direction opposite to that of switch fingers 91' and 92'. These switch fingers 91–92 and 91'–92' are part of separate electrical conductive plates which are fastened by means of rivets 93 and 93' to the opposite face of each of the non-conductive segments 89 and 90 as seen in FIG. 5.

The switch fingers 91 and 92 are related to one another in such a manner that the finger 91 as it is caused to rotate by the turning of the shaft 14 will periodically engage the free ends of the circuit conductors 34 through 45, while the switch finger 92 will be in constant contact with the grounding strip 32. The switch fingers 91' and 92' of segment 90 of the rotor disc 31 are so related that the switch finger 91' will periodically engage the free ends of the circuit conductors 61 through 72 while the switch finger 92' will engage the grounding strip 59 as formed on the rear side 58 of the wafer plate 18.

Figure 7:
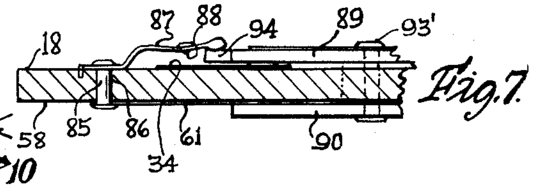
FIG. 7 is a fragmentary detailed sectional view similar to FIG. 6, but showing the shorting member displaced by the switch rotor disc.

The segment 89 of the rotor disc 31 is provided with a laterally extending cam finger 94. As will be noted in FIG. 5, the opposite sides of the camming finger 94 are tapered upwardly and terminate into a substantially flat hill portion. The shorting contacts 87 have the side walls adjacent the free ends thereof curved upwardly or away from the face of the wafer plate 18 so that in the rotation of the rotor disc 31, the cam finger 94 will readily pass beneath the free end of the shorting contact 87 and disconnect the bead 88 from contact with its associated circuit conductor. The position of the parts just described are shown in FIG. 7. The removing of the shorting contact 87 from any of the circuit conductors 34 through 45 is only accomplished when the specific circuit is sought to be established.

It should be noted that the switch fingers 91 and 92 are so related to the cam finger 94 that they will engage the free end of the circuit conductor which is to be utilized before the cam finger 94 removes the shorting contact 87 from such circuit conductor. In other words, as viewed in FIG. 3, as the rotor disc 31 is caused to be rotated in an anti-clockwise direction, the switch finger 92 thereof will engage the free end of the circuit conductor 34 before the cam finger 94 displaces the shorting contact 87. Thus a make-before-break switching operation occurs. The resulting circuit would be through the terminal 46 and its connection to a suitable electrical circuit conductor, through the printed circuit conductor 34, switch finger 91 through switch finger 92 to the grounding strip 30, to the ground terminal 33 and a suitable electric connector attached thereto.

Referring now to FIG. 4, which is the rear side 58 of the wafer plate 18, it is shown that the switch finger 91' is in contact with the circuit conductor 61 which includes the terminal 73. By external wiring, not shown, this circuit conductor 61 is connected in series with the circuit conductor 34 contained on the face of the wafer plate 18. Thus when the cam finger 94 of the rotor disc 31 disconnects the shorting contact 87 from the circuit conductor 34 subsequent to the engagement of such circuit conductor 34 by the switch finger 91, the circuit conductor 61 will also be engaged by the switch finger 91' and a complete circuit will be established through each of the conductors 34 and 61. The same construction relates to each of the remaining circuit conductors 35 through 45 and 62 through 72.

Figure 8:
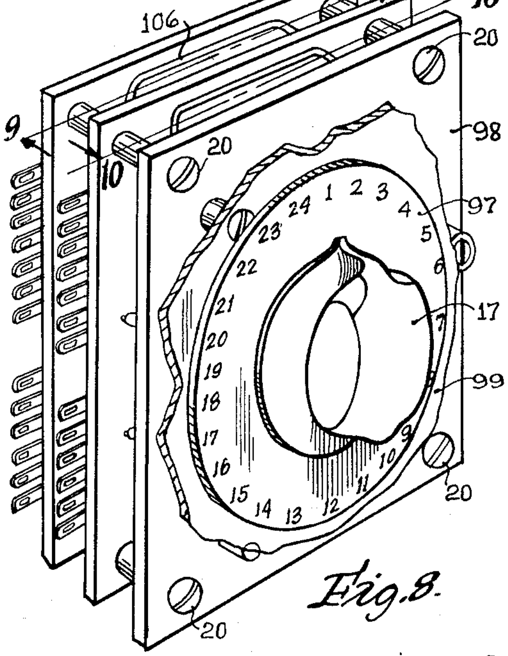
FIG. 8 is a perspective view of my improved electrical switch showing a plurality of printed circuit wafer plates associated therewith.

Referring to FIG. 8, I show a switch construction similar to that shown in FIG. 1 and hereinbefore described with the exception that the switch of FIG. 8 includes a set of switch wafer plates 95 and 96. The switch mechanism of FIG. 8 as shown by the switch position indicating dial 97 is capable of completing 24 circuits.

The wafer plates 95 and 96 are carried by a base plate 98 having connection to a wall 99 in the same manner as heretofore described and as shown in FIG. 1. The wafer plate 95 is identical to the wafer plate 18 shown in FIGS. 3 and 4. The second wafer plate 96 is similar to the wafer plate 18 of FIG. 3 differing in the respect that the printed circuit conductors 100 through 111 are radially disposed about the shaft 14 in a manner so that they lie in a plane which extends between each of the circuit conductors 34 through 45 of the wafer plate 18. Thus the circuit conductor 105 of the wafer plate 96 is adapted to lie between the circuit conductors 34 and 45 of the wafer plate 18.

Figure 9:
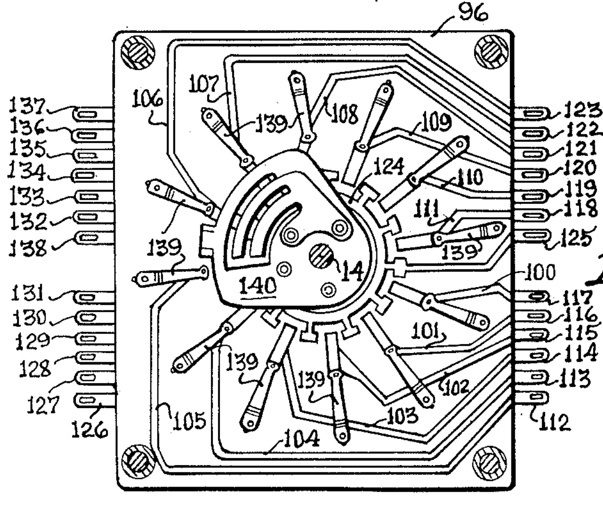
FIG. 9 is a side elevational view of the printed wafer plate taken on line 9—9 of FIG. 8.

The circuit conductors 100 through 111 each connect to a terminal 112 through 123, which terminals extend from one side of the wafer plate 96 as viewed in FIG. 9. The wafer plate 96 is likewise provided with a grounding strip 124 which is connected to a terminal 125. As viewed in FIG. 9, the terminals 126 through 138 extend laterally from the opposite side of such wafer plate 96 and each are connected to circuit conductors on the rear side thereof which are identical to the circuit conductors as shown in FIG. 4. Each of the circuit conductors 100 through 111 of wafer plate 96 is provided with a shorting contact 139 of the same construction and operation as shorting contact 87 hereinbefore described. The rotor disc 140 associated with the wafer plate 96 is identical to that shown in FIGS. 3, 4 and 5.

Figure 10:
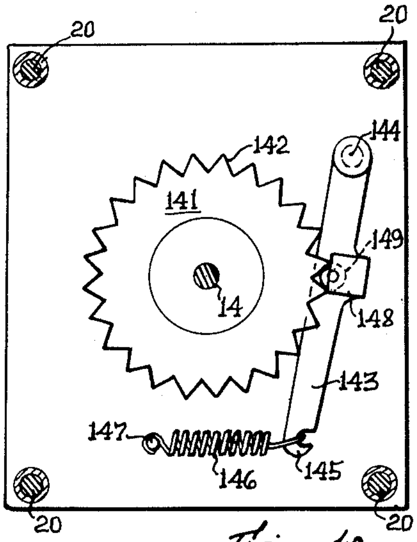
FIG. 10 is a side elevational view of the indexing mechanism associated with the switch of FIG. 8 taken on line 10—10 of FIG. 8.

In order to have the switch of FIG. 8 capable of establishing 24 individual circuits, it must be provided with an indexing mechanism similar to that shown in FIG. 2 and previously described. The indexing mechanism of the switch of FIG. 8 includes a star wheel 141 that is provided with 24 teeth 142. Each of the teeth 142 corresponds to the 24 positions of the switch knob 17. This indexing mechanism includes an indexing arm 143 pivoted as at 144 to the rear surface of the face plate 98 as seen in FIG. 10. The free end of the arm 143 is connected as at 145 to one end of the spring 146. The opposite end of the spring 146 is connected to a stud pin 147 provided by the base plate 98. By a suitable bracket 148, an indexing roller 149 is provided which through the tension of the spring 146 upon the arm 143 yieldably rests between teeth 142 of the star wheel 141 and resiliently retains the switch mechanism in the selected switch position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An electric switch comprising
(*a*) a circuit bearing wafer plate,
(*b*) a plurality of circuit conductors on each face of said wafer plate with certain circuit conductors on one face connected in series with certain corresponding circuit conductors on the opposite face of said wafer plate, (c) means carried by one face of said wafer plate and removably contacting each of said certain circuit conductors thereon for establishing a short circuit between said certain circuit conductors on each face of said plate that are connected in series, (d) means provided by said switch for simultaneously contacting selected circuit conductors on each face of said wafer plate for completing an electric circuit therethrough, (e) means provided by the contacting means for removing said shorting means from the selected circuit conductors connected in series so as to complete a circuit through the selected circuit conductors connected in series.

2. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) shorting contacts carried on one face of said wafer plate and removably contacting each of said certain circuit conductors thereon for establishing a short circuit between said certain circuit conductors on each face of said plate that are connected in series, (d) means provided by said switch for simultaneously contacting selected circuit conductors on each face of said wafer plate for completing an electric circuit therethrough, (e) means provided by the contacting means for removing said shorting contact from the selected circuit conductors connected in series so as to complete a circuit through the selected circuit conductors connected in series.

3. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) means carried by one face of said wafer plate and removably contacting each of said certain circuit conductors thereon for establishing a short circuit between said certain circuit conductors on each face of said plate that are connected in series, (d) a rotor disc having contact fingers provided by said switch for simultaneously contacting selected circuit conductors on each face of said wafer plate for completing an electric circuit therethrough, (e) means provided by said rotor disc for removing said shorting means from the selected circuit conductors connected in series so as to complete a circuit through the selected circuit conductors connected in series.

4. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) shorting contacts carried on one face of said wafer plate and removably contacting each of said certain circuit conductors thereon for establishing a short circuit between said certain circuit conductors on each face of said plate that are connected in series, (d) a rotor disc having contact fingers provided by said switch for simultaneously contacting selected circuit conductors on each face of said wafer plate for completing an electric circuit therethrough, (e) means provided by said rotor disc for removing said shorting contact from the selected circuit conductors connected in series so as to complete a circuit through the selected circuit conductors connected in series.

5. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) means carried by one face of said wafer plate and removably contacting each of said certain circuit conductors thereon for establishing a short circuit between said certain circuit conductors on each face of said plate that are connected in series, (d) means provided by said switch for contacting selected circuit conductors for completing an electric circuit therethrough, (e) a cam member provided by the contacting means for removing said shorting means from the selected circuit conductors connected in series so as to complete a circuit through the selected circuit conductors connected in series.

6. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) shorting contacts carried on one face of said wafer plate and removably contacting each of said certain circuit conductors thereon for establishing a short circuit between said certain circuit conductors on each face of said plate that are connected in series, (d) means provided by said switch for contacting selected circuit conductors for completing an electric circuit therethrough, (e) a cam member provided by the contacting means for removing said shorting contact from the selected circuit conductors subsequent to the engagement of said contact fingers with the selected circuit conductors so as to complete a circuit through the selected circuit conductors connected in series.

7. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) means carried by one face of said wafer plate and removably contacting each of said certain circuit conductors thereon for establishing a short circuit between said certain circuit conductors on each face of said plate that are connected in series, (d) a rotor disc having contact fingers provided by said switch for contacting selected circuit conductors for completing an electric circuit therethrough, (e) a cam member provided by said rotor disc for removing said shorting means from the selected circuit conductors subsequent to the engagement of said contact fingers with the selected circuit conductors so as to complete a circuit through the selected circuit conductors connected in series.

8. An electric switch comprising (a) a circuit bearing wafer plate, (b) a plurality of circuit conductors on each face of said wafer plate with certain circuit conductors on one face connected in series with certain corresponding circuit conductors on the opposite face of said wafer plate, (c) shorting contacts carried on one face of said wafer plate and removably contacting each of said certain circuit conductors thereon for establishing a short circuit between said certain circuit conductors on each face of said plate that are connected in series, (*d*) a rotor disc having contact fingers provided by said switch for contacting selected circuit conductors for completing an electric circuit therethrough, (*e*) a cam member provided by said rotor disc for removing said shorting contact from the selected circuit conductors subsequent to the engagement of said contact fingers with the selected circuit conductors so as to complete a circuit through the selected circuit conductors connected in series.

9. A switch device for establishing a multiplicity of electric circuits comprising (*a*) a group of circuit element bearing plates arranged in spaced parallel relation with respect to each other, (*b*) said plates having corresponding circuit elements on opposite faces thereof with each of the corresponding circuit elements connected in series, (*c*) a rotatable shaft axially extending relative to said plates, (*d*) a circuit making means on said shaft and rotatable therewith for selectively contacting the circuit elements on each face of each of said plates for completing a circuit therethrough, (*e*) means carried by said plates for establishing a short circuit between corresponding circuit elements on each face of said plates that are connected in series, (*f*) said means including a shorting contact on one face of each of said plates and having a portion thereof extending through said plate and connected to one circuit element on one face thereof and having a yieldable portion in contact with the corresponding circuit element on the other face of said plate, (*g*) means carried by said circuit making means and rotatable therewith into contact with a selected circuit element on said other face of each of said plates for disengaging said yieldable portion of said shorting contact from said selected circuit element so as to complete a circuit through said selected circuit elements on each face of said plate connected in series and said circuit making means.

10. A switch device for establishing a multiplicity of electric circuits comprising (*a*) a group of circuit element bearing plates arranged in spaced parallel relation with respect to each other, (*b*) said plates having corresponding circuit elements on opposite faces thereof with each of the corresponding circuit elements connected in series, (*c*) a rotatable shaft axially extending relative to said plates, (*d*) a rotor disc having circuit contacts on said shaft and rotatable therewith for selectively contacting the circuit elements on each face of each of said plates for completing a circuit therethrough, (*e*) means carried by said plates for establishing a short circuit between corresponding circuit elements on each face of said plates that are connected in series, (*f*) said means including a shorting contact on one face of each of said plates and having a portion thereof extending through said plate and connected to one circuit element on one face thereof and having a yieldable portion in contact with the corresponding circuit element on the other face of said plate, (*g*) means carried by said rotor disc and rotatable therewith into contact with a selected circuit element on said other face of each of said plates for disengaging said yieldable portion of said shorting contact from said selected circuit element so as to complete a circuit through said selected circuit elements on each face of said plate connected in series and said circuit making means.

References Cited by the Examiner

UNITED STATES PATENTS

| | | | |
|---|---|---|---|
| 2,481,649 | 9/49 | Doucette | 200—11 |
| 2,876,314 | 3/59 | Jackson | 200—11 X |
| 2,949,511 | 8/60 | Glueckstein et al. | 200—11 |

FOREIGN PATENTS

| | | |
|---|---|---|
| 121,531 | 6/46 | Australia. |
| 753,053 | 5/55 | Germany. |

BERNARD A. GILHEANY, *Primary Examiner.*